(12) United States Patent
Kottenstette et al.

(10) Patent No.: US 7,120,542 B2
(45) Date of Patent: Oct. 10, 2006

(54) FLOW MONITORING SYSTEM

(75) Inventors: Nicholas Kottenstette, Newburyport, MA (US); Ali Shajii, Canton, MA (US); Louis Slamka, Vancouver, WA (US); Siddharth P. Nagarkatti, Acton, MA (US)

(73) Assignee: MKS Instruments, Inc., Wilmington, DE (US)

( * ) Notice: Subject to any disclaimer, the term of this patent is extended or adjusted under 35 U.S.C. 154(b) by 32 days.

(21) Appl. No.: 10/814,970

(22) Filed: Mar. 30, 2004

(65) Prior Publication Data

US 2005/0222782 A1 Oct. 6, 2005

(51) Int. Cl.
*G01F 1/00* (2006.01)

(52) U.S. Cl. .................. 702/45; 702/49; 73/204.25

(58) Field of Classification Search ............. 73/204.25; 702/45, 49
See application file for complete search history.

(56) References Cited

U.S. PATENT DOCUMENTS

| | | | | |
|---|---|---|---|---|
| 4,487,063 A | * | 12/1984 | Hopper .................. | 73/204.19 |
| 6,023,969 A | * | 2/2000 | Feller .................... | 73/204.25 |
| 6,450,024 B1 | * | 9/2002 | McCulloch et al. ..... | 73/204.25 |

OTHER PUBLICATIONS

Horowitz and Holl, "The Art of Electronics", pp. 242-245, 253, and 423.*

Burr-Brown Products from Texas Instruments, INA337, INA338, "Wide-Temperature, Precision Instrumentation Amplifier," SBOS248—Jun. 2002.
PCT International Search Report for related PCT Application No.: PCT/US05/09722, 3 pages, Jan. 2006.
PCT Written Opinion of the International Searching Authority for related PCT Application No.: PCT/US05/09722, 7 pages, Jan. 2006.

* cited by examiner

Primary Examiner—Michael Nghiem
Assistant Examiner—Stephen J. Cherry
(74) Attorney, Agent, or Firm—McDermott Will & Emery LLP

(57) ABSTRACT

A flow monitoring system includes a first temperature-sensitive resistive device, thermally coupled to a first portion of a fluid transfer apparatus, for producing a first temperature-dependant voltage signal representative of the temperature of the fluid within the first portion of the fluid transfer apparatus. A first current control device, coupled to the first temperature-sensitive resistive device, controls a first current signal flowing through the first temperature-sensitive resistive device. A second temperature-sensitive resistive device, thermally coupled to a second portion of the fluid transfer apparatus, produces a second temperature-dependant voltage signal representative of the temperature of the fluid within the second portion of the fluid transfer apparatus. A second current control device, coupled to the second temperature-sensitive resistive device, controls a second current signal flowing through the second temperature-sensitive resistive device. A monitoring circuit monitors the first and second temperature-dependant voltage signals and produces an output signal representative of the volume of fluid passing through the fluid transfer apparatus.

22 Claims, 5 Drawing Sheets

FLOW MONITORING SYSTEM

FIELD OF THE INVENTION

This invention relates to flow monitoring systems and, more particularly, to flow monitoring systems for use with temperature sensitive resistive elements.

BACKGROUND

When transferring fluid (e.g., a liquid or gas) through a transfer apparatus (e.g., a pipe or a tube), the volume of fluid transferred may be measured through the use of resistive thermal sensors that are in thermal contact with the transfer apparatus. These resistive thermal sensors are often lengths of wire (that are coiled around the transfer apparatus) whose resistance value varies based on the temperature of the sensor. Typically, two sensors are positioned along the length of the transfer apparatus (i.e., one upstream and one downstream) and a constant current is driven through each thermal sensor, resulting in ohmic heating of the upstream and downstream thermal sensors. The heat generated by the upstream sensor is transferred into the fluid within the transfer apparatus. If this fluid is moving, this heat is transferred downstream (via the fluid), resulting in the heating of the downstream sensor. Accordingly, when there is no fluid flowing within the transfer apparatus, heat is not transferred between the upstream and downstream sensors and the sensors remain at an equal temperature. However, as the flow of fluid within the transfer apparatus increases, the amount of heat transferred from the upstream sensor to the downstream sensor also increases.

As the resistance of the thermal sensors varies in accordance with the temperature of the sensors, by monitoring the resistance of these sensors, the volume of fluid flowing within the transfer apparatus may be determined. As there is often a constant current flowing through these thermal sensors, the resistance values of the thermal sensors are often measured by monitoring the voltage potential across each of the thermal sensors. Unfortunately, it is often difficult to ensure that the current flowing through each thermal sensor is equal, and variations in this current induce inaccuracies in the measurement system.

SUMMARY OF THE INVENTION

According to an aspect of this invention, a flow monitoring system includes a first temperature-sensitive resistive device, thermally coupled to a first portion of a fluid transfer apparatus, for producing a first temperature-dependant voltage signal representative of the temperature of the fluid within the first portion of the fluid transfer apparatus. A first current control device, coupled to the first temperature-sensitive resistive device, controls a first current signal flowing through the first temperature-sensitive resistive device.

A second temperature-sensitive resistive device, thermally coupled to a second portion of the fluid transfer apparatus, produces a second temperature-dependant voltage signal representative of the temperature of the fluid within the second portion of the fluid transfer apparatus. A second current control device, coupled to the second temperature-sensitive resistive device, controls a second current signal flowing through the second temperature-sensitive resistive device.

A monitoring circuit monitors the first and second temperature-dependant voltage signals and produces an output signal representative of the volume of fluid passing through the fluid transfer apparatus.

One or more of the following features may also be included. The first and second current signals may be essentially equal. The first current controlling device may include a first transistor for controlling the first current signal flowing through the first temperature-sensitive resistive device. The second current controlling device may include a second transistor for controlling the second current signal flowing through the second temperature-sensitive resistive device. The first and second transistors may be field-effect transistors.

The first current controlling device may include a first amplification circuit coupled to the first transistor, such that the first amplification circuit is responsive to a first control signal and provides a first control voltage to the first transistor. The second current controlling device may include a second amplification circuit coupled to the second transistor, such that the second amplification circuit is responsive to a second control signal and provides a second control voltage to the second transistor. The first and second amplification circuits may be operational amplifiers, and the first and second control signals may be the same signal.

The first current controlling device may include a first control resistive device coupled to the first transistor, such that the first current signal flows through the first control resistive device and generates a first feedback signal that is provided to the first amplification circuit. The second current controlling device may include a second control resistive device coupled to the second transistor, such that the second current signal flows through the second control resistive device and generates a second feedback signal that is provided to the second amplification circuit.

A resistive calibration device, coupled to the first and second control resistive devices, may adjust the resistive values associated with the first and second control resistive devices. The resistive calibration device may include a digital potentiometer.

The monitoring circuit may include an instrumentation amplifier for producing the output signal, such that the instrumentation amplifier includes: a first input terminal for receiving the first temperature-dependant voltage signal; and a second input terminal for receiving the second temperature-dependant voltage signal.

A gain factor of the instrumentation amplifier may be defined by the resistive values associated with a plurality of resistors, and the gain factor may be approximately twenty. The monitoring circuit may include a low-pass filter circuit, coupled to the instrumentation amplifier, for filtering the output signal. The low-pass filter circuit may be a second-order-low pass filter circuit configured to have a three-decibel breakpoint of approximately 150 Hertz. The monitoring circuit may include a zero calibration device for applying a calibration voltage signal to the first and second input terminals of the instrumentation amplifier.

The zero calibration device may include a digital switch for temporally connecting the first and second input terminals of the instrumentation amplifier. The calibration voltage signal may be one of the first and second temperature-dependant voltage signals.

The monitoring circuit may include a first shunt resistor for coupling the monitoring circuit to the first temperature-sensitive resistive device; and a second shunt resistor for coupling the monitoring circuit to the second temperature-sensitive resistive device.

The fluid may be a liquid fluid or a gaseous fluid. The transfer apparatus may be a tube, such as a bypass tube. The first and second temperature-sensitive resistive devices may be constructed of a high positive temperature coefficient resistive material. The high positive temperature coefficient resistive material may have a temperature coefficient of approximately 4500 ppm/° C.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
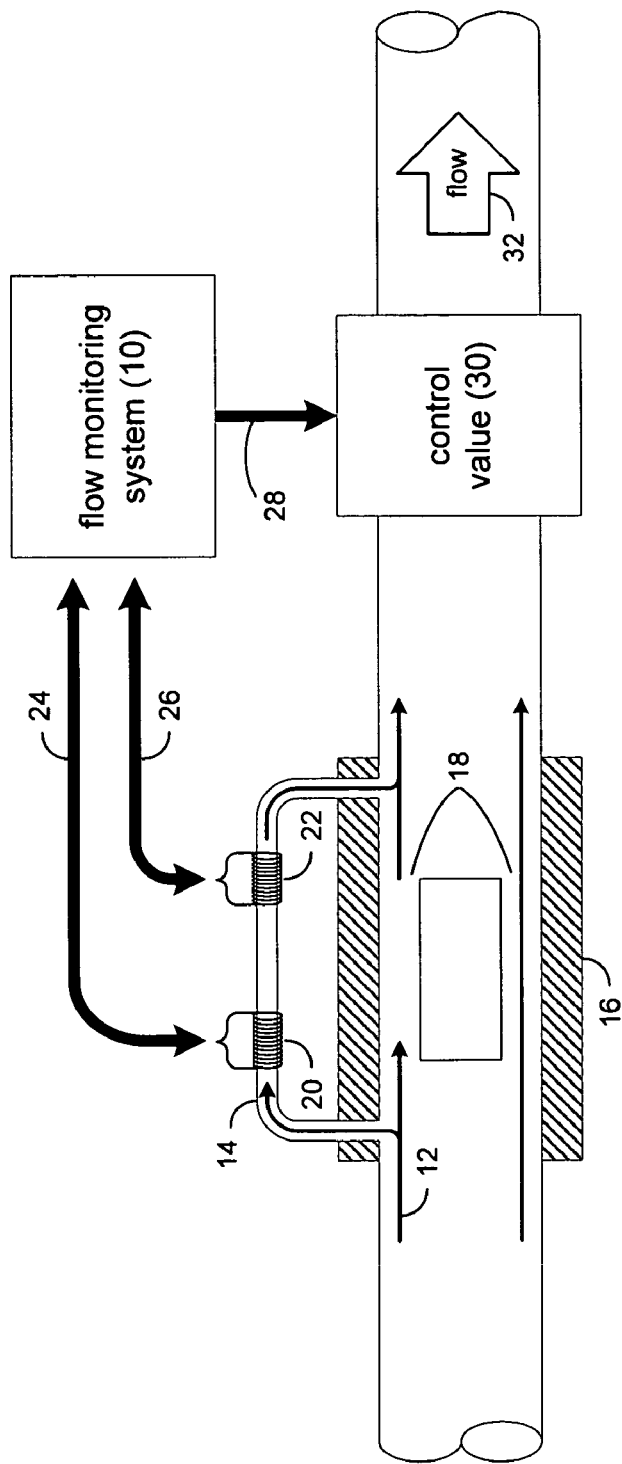
FIG. 1 is a diagrammatic view of a mass flow controller and a flow monitoring system.

Referring to FIG. 1, there is shown a flow monitoring system 10 for monitoring the flow of fluid 12 (e.g., a liquid or gas) through a fluid transfer apparatus, such as the bypass tube 14 of a mass flow controller 16. A mass flow controller 16 typically includes a primary passage 18 through which the majority (e.g., 99%) of the fluid 12 flows and the bypass tube 14 that allows for the passage of a comparatively small portion (e.g., 1%) of the fluid 12. As the ratio of fluid passing through the primary passage versus fluid passing through the bypass tube is known, by monitoring the amount of fluid passing through the bypass tube, the total amount of fluid passing through the mass flow controller 16 can be determined.

Flow monitoring system 10 includes a first and second temperature-sensitive resistive element 20, 22 that are thermally coupled to bypass tube 14, and are typically constructed of a length of resistive wire that is wrapped around the bypass tube itself. The first temperature-sensitive resistive element 20 is positioned proximate a first portion (i.e., an upstream portion) of the bypass tube 14 and the second temperature sensitive resistive element 22 is positioned proximate a second portion (i.e., a downstream portion) of the bypass tube 14.

During operation, first and second temperature-sensitive resistive elements 20, 22 provide (respectively) a first and second temperature dependant voltage signal 24, 26, each of which varies vary in accordance with the temperature of the fluid within the bypass tube 14. Voltage signals 24, 26 are processed (to be discussed below) by flow monitoring system 10 to determine the volume of fluid passing through bypass tube 14 (and, therefore, mass flow controller 16). Flow monitoring system 10 provides an output signal 28 that drives a control value 30 to regulate the overall flow 32 of fluid through mass flow controller 16.

Figure 2:
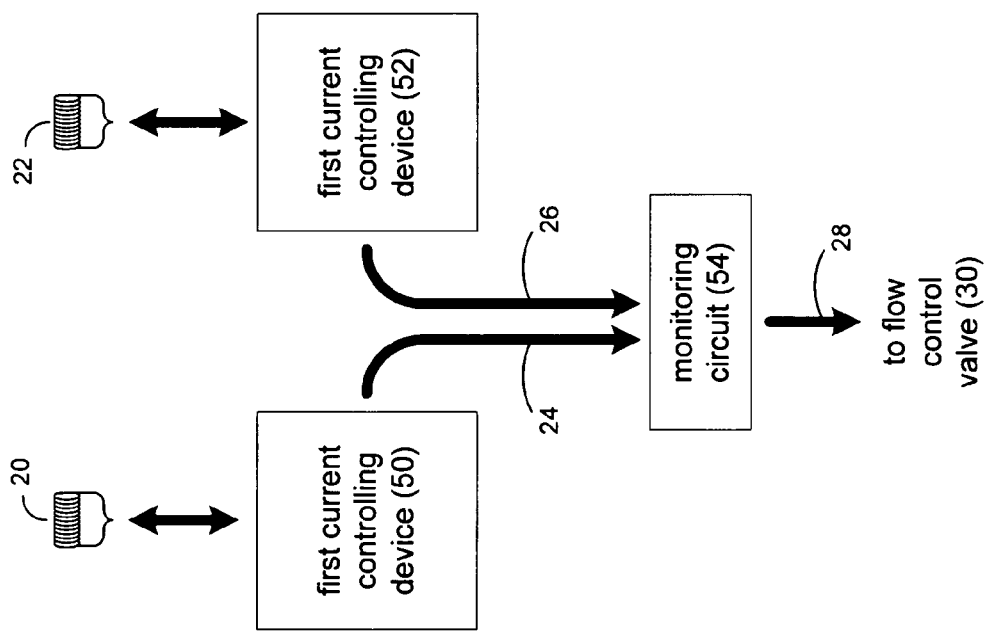
FIG. 2 is a diagrammatic view of the flow monitoring system of FIG. 1.

Referring to FIG. 2, flow monitoring system 10 includes a first current controlling device 50 for controlling the current signal flowing through the first temperature sensitive resistive device 20. A second current controlling device 52 controls the current signal flowing through the second temperature sensitive resistive device 22. As will be discussed below, temperature sensitive resistive devices 20, 22 provide temperature-dependant voltage signals 24, 26 (respectively) to monitoring circuit 54, which processes signals 24, 26 to produce output signal 28. Output signal 28, which is provided to control valve 30, is representative of the volume of fluid flowing through the bypass tube and, therefore, the mass flow controller.

Figure 3:
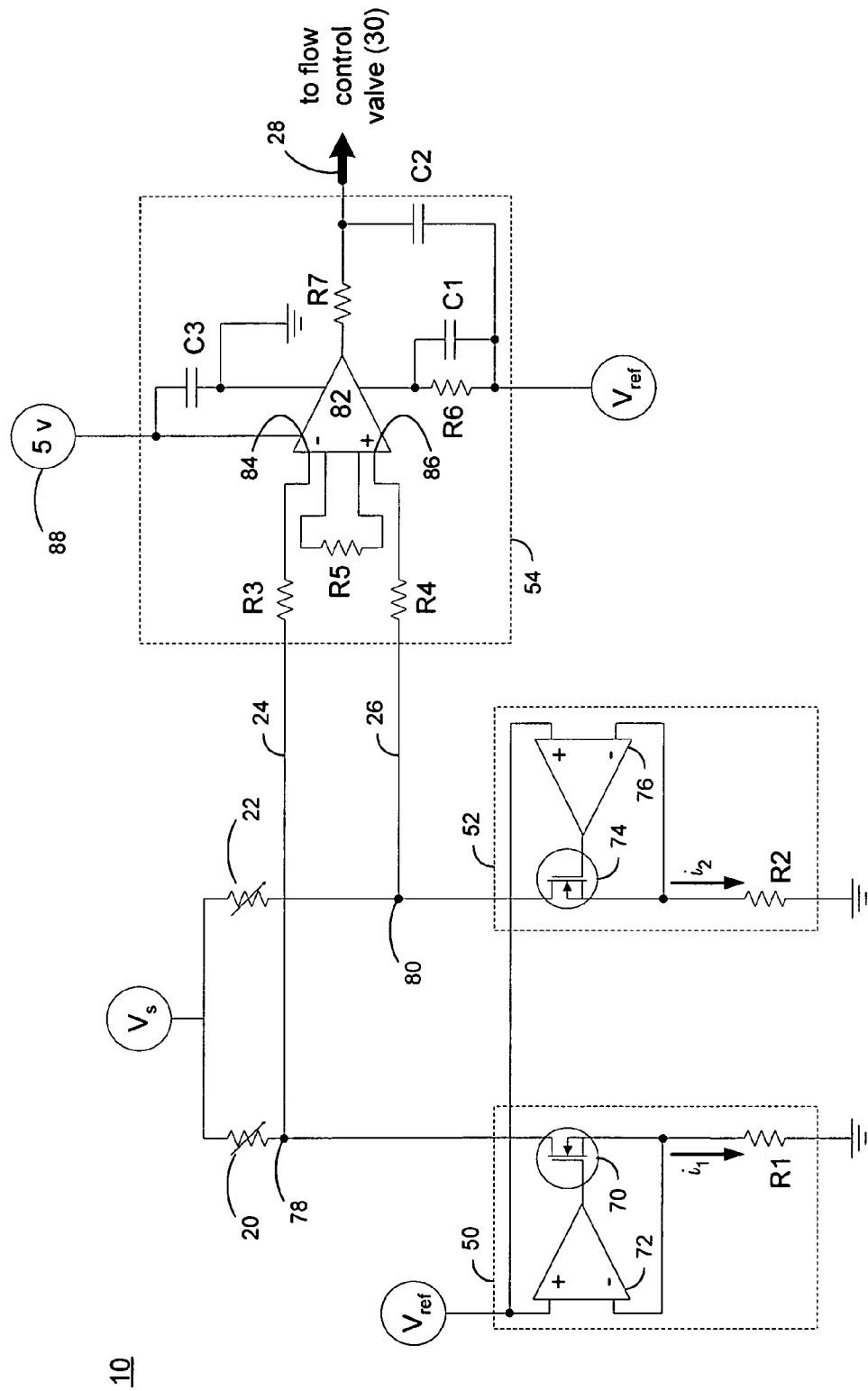
FIG. 3 is a schematic view of the flow monitoring system of FIG. 1.

Referring to FIG. 3, a voltage source $V_s$ (e.g., a 10 volt DC source) supplies voltage to first and second temperature-sensitive resistive elements 20, 22. Typically, resistive elements 20, 22 are constructed of a high positive temperature coefficient resistive coiled wire having a temperature coefficient ($\beta$) of approximately $4,500 \times 10^{-6}/°$ Celsius, wherein the coil resistance (R) has a nominal resistance ($R_o$) at a nominal temperature ($T_o$), and its actual resistance can be computed at temperature T, by: $R=R_o(1+(T-T_o)\beta)$.

First temperature-sensitive resistive element 20 is coupled to first current controlling device 50, and second temperature-sensitive resistive element 22 is coupled to second current controlling device 52.

First current controlling device 50 typically includes a transistor 70 that is controlled by an operational amplifier 72. Similarly, second current controlling device 52 typically includes a transistor 74 that is controlled by an operational amplifier 76. An example of transistors 70, 74 is a N-Channel Logic Level Enhancement Mode FET, such as the BSS138 manufactured by Fairchild Semiconductor, and a typical example of operational amplifiers 72, 76 is a Low Noise, Low Drift, Single-Supply Amplifiers of the OP113 family which can also be used in a dual OP213 package manufactured by Analog Devices.

Alternatively, instead of being discrete components, transistors 70, 74 and operational amplifier 72, 76 may be formed in a semiconductor substrate and incorporated into an integrated circuit chip (not shown).

During operation of flow monitoring system 10, a voltage source $V_{ref}$ supplies a voltage signal to the non-inverting input of operational amplifiers 74, 76. Since, by design, an operational amplifier maintains essentially a zero volt differential between inverting and non-inverting input terminals, a voltage potential equal to voltage signal $V_{ref}$ is maintained across resistor R1 (by operational amplifier 72) and across resistor R2 (by operational amplifier 76).

Since, in this particular embodiment, transistors 70, 74 are MOSFETs (i.e., metal-oxide semiconductor field-effect transistors), by varying the voltage signal applied to the gate of transistors 70, 74, the current $i_1$ and $i_2$ flowing through resistors R1 and R2 is regulated to maintain the voltage potential across resistors R1 and R2 at $V_{ref}$.

Typically, the resistance value of R1 and R2 is equal and, therefore, current signal $i_1$ and $i_2$ are also equal. However, by varying the value of either resistor R1 or R2, the ratio of current passing through these resistors may be adjusted (to be discussed below).

Since the current passing through resistor R1 is essentially equal to the current passing through resistive element 20, and the current passing through resistor R2 is essentially equal to the current passing through resistive element 22, by varying the value of resistors R1 and/or R2, the current signals passing through resistive devices 20, 22 are also varied.

As discussed above, the first temperature-sensitive resistive element 20 is positioned proximate a first portion (i.e., an upstream portion) of the bypass tube and the second temperature sensitive resistive element 22 is positioned proximate a second portion (i.e., a downstream portion) of the bypass tube. During operation, a current is passed through each resistive element, resulting in ohmic heating of the resistive elements. This heat is subsequently transferred to the fluid within the bypass tube. In the event that the fluid within the tube is not moving, the heat will not be transferred between the resistive elements 20, 22 and, therefore, the resistance of the resistive elements will remain essentially equal. However, as the fluid within the bypass tube begins to move from the upstream portion to the downstream portion, fluid passing through the upstream portion absorbs the heat generated by the first resistive element 20 (i.e., the cooler fluid cools resistive element 20). This heat is then transferred to the downstream portion of the bypass tube and sensed by the second resistive element 22 (i.e., the warmer fluid warms resistive element 22).

As discussed above, the resistive values of resistive elements 20, 22 are temperature dependant and, therefore, vary directly in accordance with the temperature proximate the resistive element. As the current passing though each of the resistive elements is constant, any variation in the resistance of a resistance elements results in a variation of the voltage drop across that resistive element.

Continuing with the above-stated example, as the fluid within the bypass begins to flow, the resistance of the first resistive element decreases and the resistance of the second resistive element increases. These variations in resistance result in a decrease in the voltage potential at terminal 78 (i.e., voltage signal 24) and an increase in the voltage potential at terminal 80 (i.e., voltage signal 26).

As discussed above, the combination of transistor 70 and operational amplifier 72 maintain a voltage drop of $V_{ref}$ across resistor R1. Accordingly, the value of voltage signal 24 at terminal 78 is $V_{ref}+V_{ds}$ (i.e., the drain-source voltage drop of transistor 70). Therefore, the voltage drop across resistive element 20 is $Vs-(V_{ref}+V_{ds})$.

As resistive elements 20, 22 are typically constructed of a high positive temperature coefficient resistive material, an increase in the temperature of a resistive element results in an increase in the resistance of that resistive element. Accordingly, since the current passing through the resistive element is constant, an increase in the temperature of the resistive element results in a greater voltage drop across the resistive element and a corresponding reduction in the voltage drop across the transistor (i.e., a reduction in $V_{ds}$). Resistive element 22, transistor 74, and operational amplifier 76 function similarly to that of the above-described components.

Voltage signals 24, 26 are provided to monitoring circuit 54, which processes signals 24, 26 to produce output signal 28 that is provided to control value 30. Monitoring circuit 54 typically includes an amplification circuit, such as instrumentation amplifier 82, which includes a first input terminal 84 for receiving voltage signal 24 and a second input terminal 86 for receiving voltage signal 26. A typical example of instrumentation amplifier 82 is an INA 337/338 manufactured by Texas Instruments. Instrumentation amplifier 82 amplifies the difference between the voltage signals received on input terminals 84, 86. Typically, a shunt resistor R3, R4 is used to couple each of the input terminals 84, 86 to terminals 78, 80 (respectively), thus protecting instrumentation amplifier 82 during power up. Voltage source $V_s$, which typically has a potential greater than 5.00 volts, is connected to inputs 84, 86 of instrumentation amplifier 82 through resistive elements 20, 22. Transistors 70, 74 typically have a finite "activation time" on power up. Instrumentation amplifier 82 typically has one or more internal diode clamps (not shown) to shunt current to voltage source 88. This, in turn, typically causes current to flow through each diode in instrumentation amplifier 82, such that the value of this current is equal to (Vs−(5V+0.5V))/(R20+R3), which is typically less than 10 milliamps, thus allowing the amplifier to be safely operated, even on power-up.

Resistors R5, R6 set the gain (G) of instrumentation amplifier 82 in accordance with the following equation:

$$G=2R/R5 \qquad \text{[Equation 1]}$$

A typical value for gain (G) is twenty. Additionally, the use of capacitor C1 (in conjunction with resistor R6) and capacitor C2 (in conjunction with resistor R7) allow instrumentation amplifier 82 to function as a second-order low pass filter. Ideally, the values of C1, C2, R6, and R7 are chosen so that instrumentation amplifier 82 has a 3 dB (i.e., decibel) breakpoint of 150 hertz. A third capacitor C3 is a bypass capacitor that shunts (to ground) any AC component of the power supplied to instrumentation amplifier 82 by voltage source 88.

While monitoring circuit 54 is described above as being used with a single ended power supply, a dual power supply may also be used to regulate the current through each of the resistive sensors. In the above-described single ended power supply design, the signal "ground" for output 28 (i.e., $V_{out}$) is defined by $V_{ref}$ that, in this embodiment, is 2.50 V. Accordingly, for zero fluid flow, $V_{out}-V_{ref}=0.00V$ (i.e., 2.50V−2.50V); for positive full-scale fluid flow, $V_{out}-V_{ref}=2.50V$ (5.00V−2.50V); and for negative full-scale fluid flow, $V_{out}-V_{ref}=-2.50V$ (0.00V−2.50V), thus allowing use with single ended analog-to-digital converters that require a single ended 5.00 V power supply.

Concerning the above-described circuit, typical component values are: C1=4,700 pF; C2=1.0 µF; C3=0.1 µF; R1=24Ω.; R2=24Ω.; R3=499Ω.; R4=499Ω.; R5=20.0 kΩ; R6=20.0 kΩ; and R7=1.0 kΩ.

Figure 4:
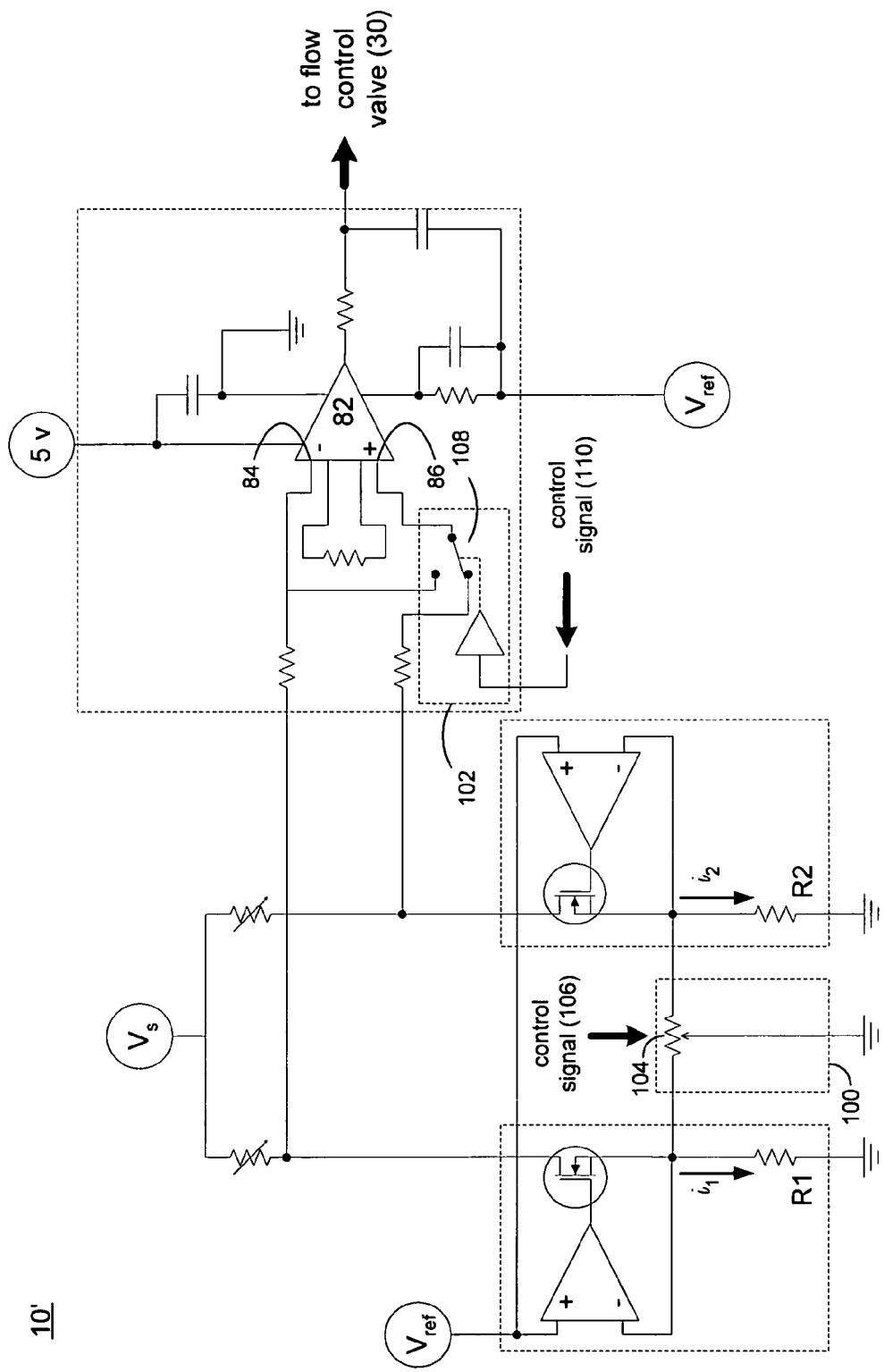
FIG. 4 is a schematic view of an alternative embodiment of the flow monitoring system of FIG. 1.

Referring to FIG. 4, an alternative embodiment of flow monitoring system 10' is shown that includes a resistive calibration device 100 and a zero calibration device 102.

Figure 5:
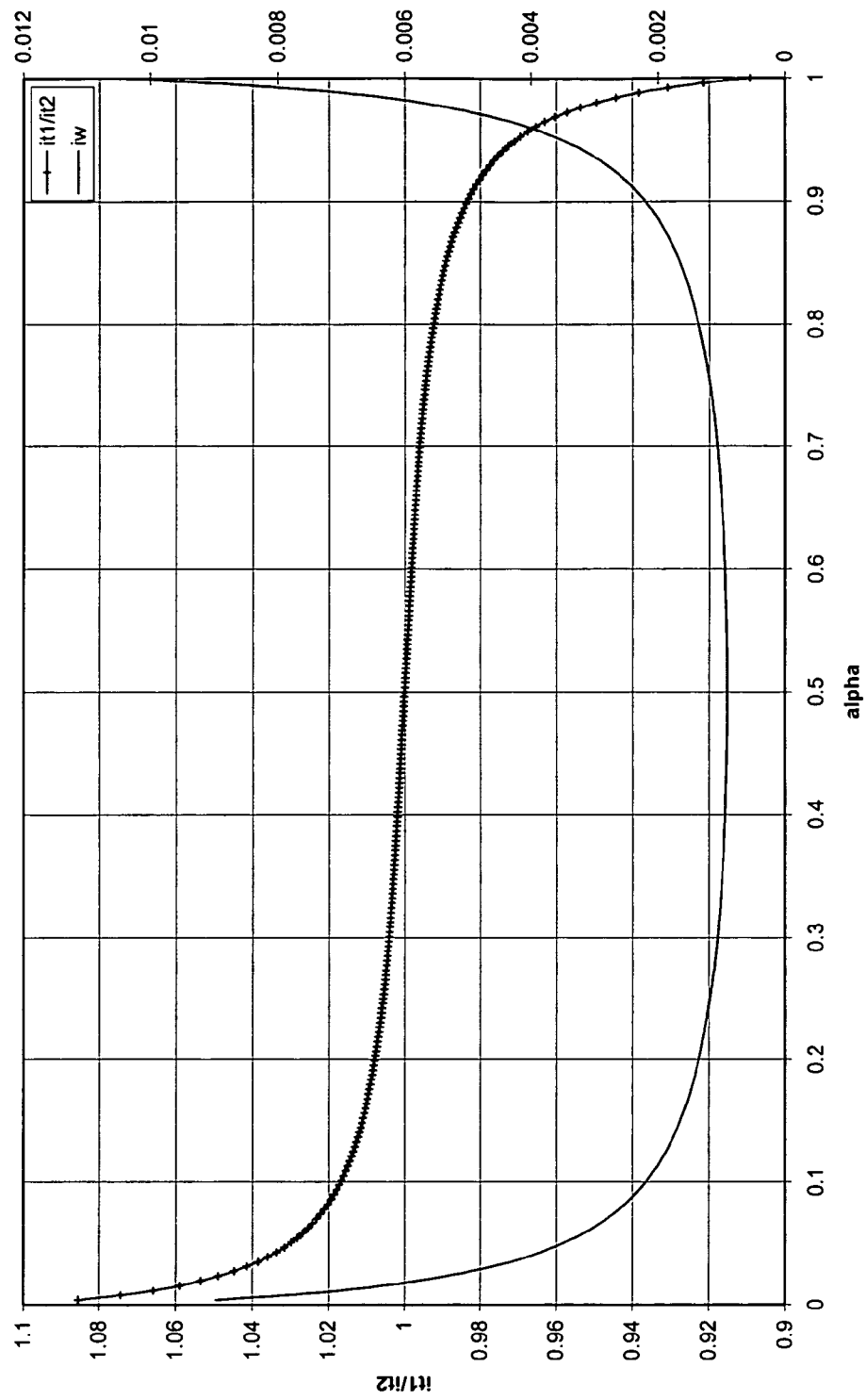
FIG. 5 is a current ratio chart according to the flow monitoring system of FIG. 1.

Resistive calibration device 100 typically includes a potentiometer 104, coupled between resistors R1 and R2, in which the wiper of the potentiometer is shorted to ground. Typically, potentiometer 104 is a digital potentiometer (e.g., an AD5241 10 k Ohm potentiometer from Analog Devices) that is remotely adjustable via a control signal 106. Potentiometer 104, when used with a 240 Ohm resistor ($R_w$) attached to the wiper of the potentiometer allows the user to vary the current ratio between sensor elements 20 and 22. By adjusting the ratio of the resistance of potentiometer 104, a portion of the currents, $i_{f1}$ and $i_{f2}$ can be adjusted as follows: The current controlled through sensor element 20 ($i_{t1}$) is equal to $i_1$ plus $i_{f1}$ (i.e., $i_{t1}=i_1+i_{f1}$). Likewise, the current controlled through sensor element 22 ($i_{t2}$) is equal to $i_2$ plus $i_{f2}$ (i.e., $i_{t2}=i_2+i_{f2}$). By design $i_1$ equals $i_2$ since R1 equals R2 (i.e., $i_1=V_{ref}/R1=V_{ref}/R2=i_2$). Accordingly, potentiometer 104 controls the ratio ($\alpha$) such that a equals the ratio of $R_{f1}$ to $R_p$ (i.e., $\alpha=R_{f1}/R_p$), in which $R_p$ is 10 k Ohms. The total current through the wiper ($i_w$) of potentiometer 104 is equal to $V_{ref}/((\alpha-\alpha^2)R_p+R_w)$, which is also equal to the sum of $i_{f1}$ and $i_{f2}$ (i.e., $i_w=i_{f1}+i_{f2}$). Accordingly, the relationship between $i_{f1}$, $i_{f2}$ and a can be determined. Since the fractional currents have the form $(i_{f1}=(1-\alpha)i_w)$ and $(i_{f2}=\alpha i_w)$, the total current ratio can be appropriately adjusted as shown in FIG. 5.

Referring again to FIG. 4, zero calibration device 102 includes a switch 108 that allows for the shorting of input terminals 84, 86 of instrumentation amplifier 82, while isolating input terminal 86 from voltage signal 26. Typically, switch 108 is a digital switch that is remotely adjustable via a control signal 110. When input terminals 84, 86 are shorted together, voltage signal 24 functions as a calibration voltage signal applied to both input terminals of the instrumentation amplifier 82. Since instrumentation amplifier 82 is a difference amplifier, as both input terminals 84, 86 of the instrumentation amplifier 82 are tied to the same signal, output signal 28 should be zero. Accordingly, the accuracy and proper operation of instrumentation amplifier 82 can be verified using switch 108.

Once the operation of instrumentation amplifier 82 is verified, a zero fluid flow condition can be established to determine if output signal 28 is zero. In the event that output signal 28 is not zero, potentiometer 104 can be adjusted to fine tune the current ratio (i.e., $i_1/i_2$) between resistors R1 and R2, thus allowing for the zeroing of output signal 28 during a zero fluid flow condition.

While the fluid passing through the mass flow controller is described above as being a liquid or a gas, other configurations are possible. For example, fluid 12 may be a granular solid, such as sugar or flour.

While the current ratio controlling apparatus is described above as including two temperature-sensitive resistive devices, other configurations are possible that include additional sensors.

While output signal 28 is shown above as being provided directly to control value 30, other configurations are possible. For example, output signal 28 may be provided to a centralized monitoring system (not shown) that collects data from various devices within the system and provides an output signal to valve 30.

A number of implementations have been described. Nevertheless, it will be understood that various modifications may be made. Accordingly, other implementations are within the scope of the following claims.

What is claimed is:

1. A flow monitoring system comprising:
   a first temperature-sensitive resistive device, thermally coupled to a first portion of a fluid transfer apparatus, for producing a first temperature-dependant voltage signal representative of the temperature of the fluid within the first portion of the fluid transfer apparatus;
   a first current control device, coupled to the first temperature-sensitive resistive device, for controlling a first current signal flowing through the first temperature-sensitive resistive device, wherein the first current controlling device includes (i) a first transistor for controlling the first current signal flowing through the first temperature-sensitive resistive device, (ii) a first amplification circuit coupled to the first transistor, wherein the first amplification circuit is responsive to a first control signal and provides a first control voltage to the first transistor, and (iii) a first control resistive device coupled to the first transistor, wherein the first current signal flows through the first control resistive device and generates a first feedback signal that is provided to the first amplification circuit;
   a second temperature-sensitive resistive device, thermally coupled to a second portion of the fluid transfer apparatus, for producing a second temperature-dependant voltage signal representative of the temperature of the fluid within the second portion of the fluid transfer apparatus;
   a second current control device, coupled to the second temperature-sensitive resistive device, for controlling a second current signal flowing through the second temperature-sensitive resistive device, wherein the second current controlling device includes (i) a second transistor for controlling the second current signal flowing through the second temperature-sensitive resistive device, and (ii) a second amplification circuit coupled to the second transistor, wherein the second amplification circuit is responsive to a second control signal and provides a second control voltage to the second transistor, and (iii) a second control resistive device coupled to the second transistor, wherein the second current signal flows through the second control resistive device and generates a second feedback signal that is provided to the second amplification circuit;
   a monitoring circuit for monitoring the first and second temperature-dependant voltage signals and producing an output signal representative of the volume of fluid passing through the fluid transfer apparatus; and
   a resistive calibration device, coupled to the first and second control resistive devices, for adjusting the resistive values associated with the first and second control resistive devices.

2. The flow monitoring system of claim 1 wherein the first and second current signals are essentially equal.

3. The flow monitoring system of claim 1 wherein the first and second transistors are field effect transistors.

4. The flow monitoring system of claim 1 wherein the first and second amplification circuits are operational amplifiers.

5. The flow monitoring system of claim 1 wherein the first and second control signals are the same signal.

6. The flow monitoring system of claim 1 wherein the resistive calibration device includes a digital potentiometer.

7. The flow monitoring system of claim 1 wherein the monitoring circuit includes an instrumentation amplifier for producing the output signal, wherein the instrumentation amplifier includes:
   a first input terminal for receiving the first temperature-dependant voltage signal; and
   a second input terminal for receiving the second temperature-dependant voltage signal.

8. The flow monitoring system of claim 7 wherein a gain factor of the instrumentation amplifier is defined by the resistive values associated with a plurality of resistors.

9. The flow monitoring system of claim 8 wherein the gain factor is approximately twenty.

10. The flow monitoring system of claim 7 wherein the monitoring circuit includes a low-pass filter circuit, coupled to the instrumentation amplifier, for filtering the output signal.

11. The flow monitoring system of claim 10 wherein the low-pass filter circuit is a second-order-low pass filter circuit configured to have a three-decibel breakpoint of approximately 150 Hertz.

12. The flow monitoring system of claim 7 wherein the monitoring circuit includes a zero calibration device for applying a calibration voltage signal to the first and second input terminals of the instrumentation amplifier.

13. The flow monitoring system of claim 12 wherein the zero calibration device includes a digital switch for temporally connecting the first and second input terminals of the instrumentation amplifier.

14. The flow monitoring system of claim 13 wherein the calibration voltage signal is one of the first and second temperature-dependant voltage signals.

15. The flow monitoring system of claim 1 wherein the monitoring circuit includes:
   a first shunt resistor for coupling the monitoring circuit to the first temperature-sensitive resistive device; and a second shunt resistor for coupling the monitoring circuit to the second temperature-sensitive resistive device.

16. The flow monitoring system of claim 1 wherein the fluid comprises a liquid.

17. The flow monitoring system of claim 1 wherein the fluid comprises a gas.

18. The flow monitoring system of claim 1 wherein the transfer apparatus is a tube.

19. The flow monitoring system of claim 18 wherein the tube is a bypass tube.

20. The flow monitoring system of claim 1 wherein the first and second temperature-sensitive resistive devices are constructed of a high positive temperature coefficient resistive material.

21. The flow monitoring system of claim 20 wherein the high positive temperature coefficient resistive material has a temperature coefficient of approximately 4500 ppm/° C.

22. A flow monitoring system comprising:
a first temperature-sensitive resistive device, thermally coupled to a first portion of a fluid transfer apparatus, for producing a first temperature-dependant voltage signal representative of the temperature of the fluid within the first portion of the fluid transfer apparatus;
a first current controlling device that is coupled to the first temperature-sensitive resistive device, wherein the first current controlling device includes (i) a first transistor for controlling a first current signal flowing through the first temperature-sensitive resistive device, (ii) a first amplification circuit coupled to the first transistor, wherein the first amplification circuit is responsive to a first control signal and provides a first control voltage to the first transistor, and (iii) a first control resistive device coupled to the first transistor, wherein the first current signal flows through the first control resistive device and generates a first feedback signal that is provided to the first amplification circuit;
a second temperature-sensitive resistive device, thermally coupled to a second portion of the fluid transfer apparatus, for producing a second temperature-dependant voltage signal representative of the temperature of the fluid within the second portion of the fluid transfer apparatus; and
a second current controlling device that is coupled to the second temperature-sensitive resistive device, wherein the second current controlling device includes (i) a second transistor for controlling a second current signal flowing through the second temperature-sensitive resistive device, (ii) a second amplification circuit coupled to the second transistor, wherein the second amplification circuit is responsive to a second control signal and provides a second control voltage to the second transistor, and (iii) a second control resistive device coupled to the second transistor, wherein the second current signal flows through the second control resistive device and generates a second feedback signal that is provided to the second amplification circuit; and
a resistive calibration device, coupled to the first and second control resistive devices, for adjusting the resistive values associated with the first and second control resistive devices.

* * * * *